(12) United States Patent
Sasaki et al.

(10) Patent No.: US 7,187,493 B2
(45) Date of Patent: Mar. 6, 2007

(54) LASER MICROSCOPE

(75) Inventors: Hiroshi Sasaki, Tokyo (JP); Yoshihiro Shimada, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/006,373

(22) Filed: Oct. 29, 2001

(65) Prior Publication Data
US 2002/0085274 A1 Jul. 4, 2002

(30) Foreign Application Priority Data
Oct. 31, 2000 (JP) .............................. 2000-333782

(51) Int. Cl.
G02B 21/00 (2006.01)
(52) U.S. Cl. ....................... 359/381; 359/368; 359/385
(58) Field of Classification Search ................ 359/368, 359/381, 385, 388–389, 639–640; 250/458.1, 250/205, 204; 356/318, 319–325; 372/29.02, 372/32
See application file for complete search history.

(56) References Cited

U.S. PATENT DOCUMENTS

| | | | | |
|---|---|---|---|---|
| 4,449,821 A * | 5/1984 | Lee | ............................. | 356/319 |
| 4,972,258 A | 11/1990 | Wolf et al. | | |
| 5,029,245 A * | 7/1991 | Keranen et al. | ............. | 250/205 |
| 5,287,367 A * | 2/1994 | Yanagawa | .................... | 372/31 |
| 5,684,582 A * | 11/1997 | Eastman et al. | ............. | 356/328 |
| 5,793,049 A * | 8/1998 | Ballard | .................... | 250/458.1 |
| 5,835,262 A | 11/1998 | Iketaki et al. | | |
| 5,886,784 A * | 3/1999 | Engelhardt | .................. | 356/326 |
| 5,995,867 A | 11/1999 | Zavislan et al. | | |
| 6,038,023 A * | 3/2000 | Carlson et al. | ............. | 356/326 |
| 6,167,173 A * | 12/2000 | Schoeppe et al. | ........... | 250/205 |
| 6,611,643 B2 * | 8/2003 | Birk et al. | .................... | 385/33 |
| 2002/0050564 A1 * | 5/2002 | Birk et al. | .................. | 250/306 |

FOREIGN PATENT DOCUMENTS

| | | |
|---|---|---|
| JP | 11-231222 | 8/1999 |
| JP | 2000-206415 | 7/2001 |
| WO | WO 98/57152 | * 12/1998 |

OTHER PUBLICATIONS

Patent Abstracts of Japan, vol. 2000, No. 01, Jan. 31, 2000 and JP 11-271636 A (Olympus Optical Co., Ltd.), Oct. 8, 1999—Abstract; Fig. 1.

* cited by examiner

Primary Examiner—Drew A. Dunn
Assistant Examiner—Joshua L. Pritchett
(74) Attorney, Agent, or Firm—Frishauf, Holtz, Goodman & Chick, P.C.

(57) ABSTRACT

A laser microscope is provided in which a beam splitter extracts a part of a laser light of two wavelengths $\lambda 1=488$ nm and $\lambda 2=514.5$ nm, a prism spectrally resolves the laser light of the two wavelengths $\lambda 1$ and $\lambda 2$, a two-split photodiode detects intensities of two lines spectrally resolved in this manner, and a controller controls an acousto-optical tunable filter (AOTF) fixed to an output end of an argon laser based on a detection signal outputted from the two-split photodiode so that respective light intensities of both lines of wavelengths $\lambda 1$ and $\lambda 2$ become constant.

10 Claims, 3 Drawing Sheets

LASER MICROSCOPE

CROSS-REFERENCE TO RELATED APPLICATIONS

This application is based upon and claims the benefit of priority from the prior Japanese Patent Application No. 2000-333782, filed Oct. 31, 2000, the entire contents of which are incorporated herein by reference.

BACKGROUND OF THE INVENTION

1. Field of the Invention

The present invention relates to a laser microscope for use particularly in biological, medical, and other applications, which irradiates a sample with a laser light constituted of a plurality of emission wavelengths through an objective lens and detects fluorescent light from the sample.

2. Description of the Related Art

There is a laser microscope for use in biological, medical, and other applications. In the laser microscope, for example, it is requested to observe a live cell or tissue over a long time as it is.

For example, there is an observation of a change of a concentration of calcium in the cell or the tissue. A method of the observation comprises: dyeing a sample with a fluorescent indicator which emits a fluorescent light in accordance with the calcium concentration; irradiating the sample with a laser light (excitation light) of a wavelength suitable for the fluorescent indicator; and detecting the fluorescent light from the sample.

In this case, the change of a signal (fluorescent light) from the cell or the tissue is generally remarkably small. Therefore, an intensity of the laser light with which the sample is irradiated is required to be stable at a high precision over a long time.

Some causes for which the intensity of the laser light for the irradiation of the sample is not stable are considered. There is a method of controlling the intensity of the laser light, comprising: monitoring the intensity of an emitted laser light; feeding the laser light intensity back to a controller; and controlling the laser light intensity. However, such feedback is not performed in a general helium neon laser. Therefore, an output power of the helium neon laser fluctuates with a change of environmental temperature, and the like.

Moreover, there is a multi-wavelength oscillation. For example, argon lasers oscillate with the laser light of wavelengths of 488 nm, 514.5 nm. Some of the argon lasers monitor and feedback-control the intensity of the emitted laser light.

However, the argon laser monitors a general output of the argon laser light of the wavelengths of 488 nm, 514.5 nm. The outputs of respective lines of these wavelengths compete among emission modes (wavelengths of 488 nm, 514.5 nm), and thereby each emission wavelength fluctuates. Furthermore, by consumption of an argon gas, an intensity ratio of the emission outputs of the argon laser light (intensity ratio of the wavelengths of 488 nm, 514.5 nm) changes with a use time.

On the other hand, there is a laser microscope for introducing the laser light into an optical fiber and guiding the laser light into a laser microscope main body by the optical fiber. In the laser microscope, the intensity of the laser light with which the sample is irradiated fluctuates by an output fluctuation by the optical fiber during undergoing of the change of environmental temperature, and a fluctuation of a light introduction efficiency by thermal deformation of a constituting element.

The intensity of the laser light fluctuates by the aforementioned causes, although the signal (fluorescent light) from the sample does not actually change. In this case, an erroneous result is possibly caused as if there were the change of the signal.

A technique for stabilizing the intensity of the laser light with which the sample is irradiated is disclosed, for example, in Jpn. Pat. Appln. KOKAT Publication Nos. 11-231222 and 2000-206415. In the Jpn. Pat. Appln. KOKAT Publication No. 11-231222, after the laser lights of a plurality of wavelengths are combined, some of the laser lights are split by a beam splitter. Subsequently, a changeable filter selects the wavelength, and an optical detector (first detection element) receives the laser light of the selected wavelength. Moreover, a laser output or a laser intensity is controlled based on a detection signal of the laser light intensity. It is described that the laser intensity is controlled, for example, by an acousto-optical element (e.g., an acousto-optical tunable filter (AOTF)) disposed between the laser and the optical fiber.

The Jpn. Pat. Appln. KOKAI Publication No. 2000-206415 discloses a method comprising: controlling an operation in combination with a linear filter ring driven by a control unit, an area selection filter ring, or a filter slider; detecting an output of a selected laser line; driving the AOTF based on the detection signal; and stabilizing the output of the selected laser line, in order to constantly monitor laser radiation connected to a scanning module.

In recent years, in order to further pursue a function of the cell or the tissue, it has strongly been requested to simultaneously detect two or more types of samples (fluorescent light) from the sample, and analyze the function. For example, for fluorescent proteins of different wavelengths, such as a green fluorescent protein (GFP: a protein emitting a green fluorescent light) and a red fluorescent protein (RFP: a protein emitting a red fluorescent light), a gene is developed in the cell, and observed with time.

In this case, the laser light with which the sample is to be irradiated needs to have a wavelength optimum for these fluorescent proteins GFP, RFP. Additionally, both the laser lights of the two wavelengths need to have the light intensities stabilized.

However, in the techniques described in the two publications, only the intensity of the laser light of one wavelength is stabilized, and the laser lights of two or more wavelengths cannot simultaneously be controlled so as to stabilize the intensities of the laser lights.

To solve the problem, an object of the present invention is to provide a laser microscope capable of simultaneously and steadily controlling an intensity of a laser light constituted of a plurality of wavelengths with which a sample is to be irradiated for each wavelength.

BRIEF SUMMARY OF THE INVENTION

According to the present invention, there is provided a laser microscope, which irradiate a sample with a laser light constituted of a plurality of emission wavelengths through an objective lens, and detecting a fluorescent light from the sample, the laser microscope comprising: a spectral resolution section configured to spectrally resolve the laser light; a light receiving element array configured to receive the laser lights spectrally resolved by the spectral resolution section; and a controller configured to receive an output signal of the light receiving element array and controlling the laser light for each emission wavelength.

According to the present invention, there is provided a laser microscope, which irradiate a sample with a laser light constituted of a plurality of emission wavelengths through an objective lens, and detecting a fluorescent light from the sample, the laser microscope comprising: an optical fiber configured to guide the laser light; a collimator lens configured to collimate the laser light guided by the optical fiber; a beam splitter configured to split a part of the laser light collimated by the collimator lens; a spectral resolution section configured to spectrally resolve the laser light split by the beam splitter; a converging lens configured to converge the laser light spectrally resolved by the spectral resolution section; a light receiving element array configured to receive the laser light converged by the converging lens; and a controller configured to receive an output signal of the light receiving element array and controlling the laser light for each emission wavelength.

As described above in detail, according to the present invention, there can be provided the laser microscope capable of simultaneously and steadily controlling an intensity of the laser light constituted of a plurality of wavelengths with which the sample is to be irradiated for each wavelength.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will be described hereinafter with reference to the drawings.

Figure 1:
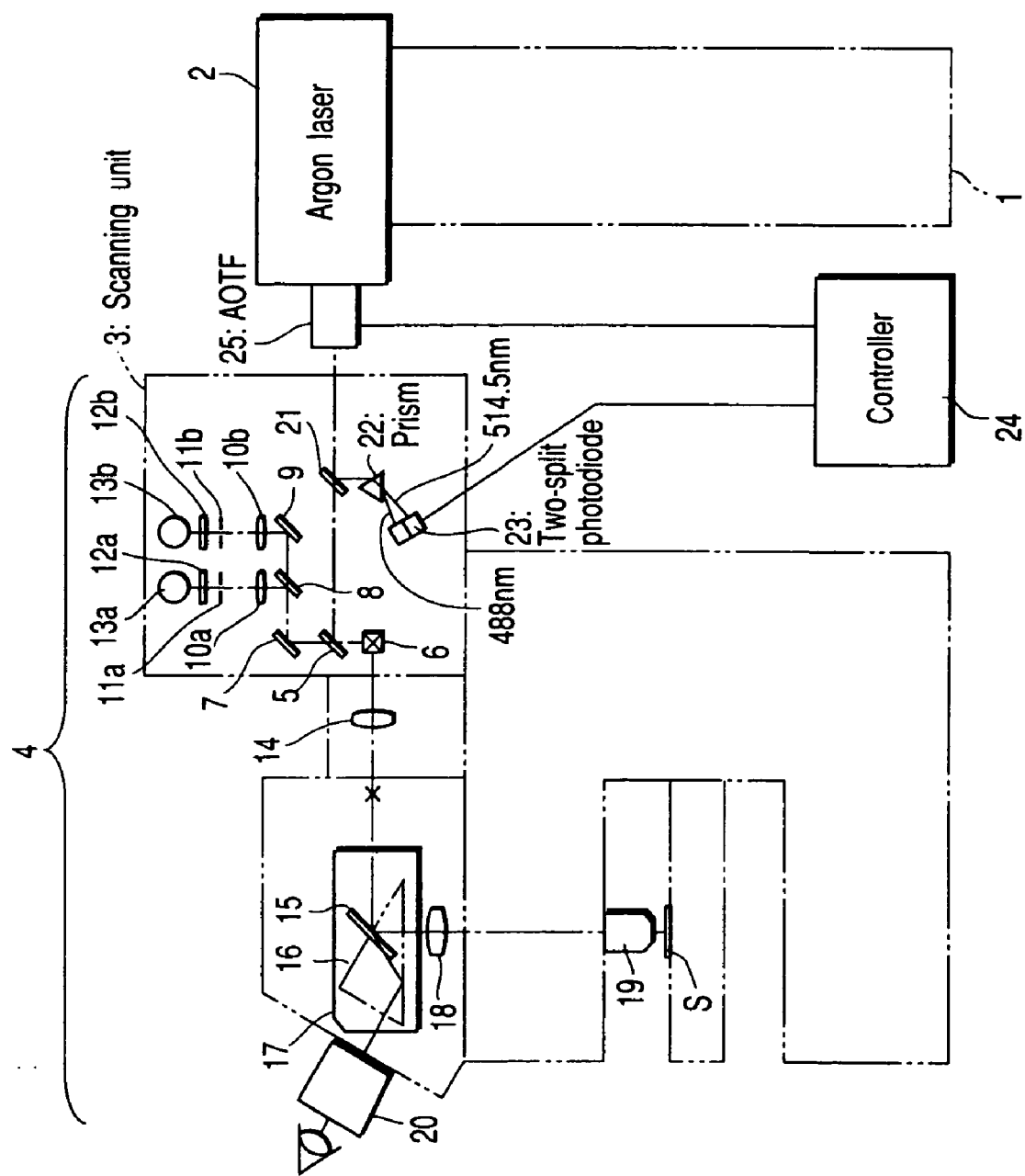
FIG. 1 is a constitution diagram showing a first embodiment of a scanning type laser microscope according to the present invention.

FIG. 1 is a constitution diagram of a laser scanning microscope. An argon laser 2 is fixed on a base 1. The argon laser 2 emits a laser light of two wavelengths of $\lambda 1=488$ nm and $\lambda 2=514.5$ nm.

A scanning unit 3 is disposed on an optical path of the laser light emitted from the argon laser 2. The scanning unit 3 constitutes a part of a laser microscope main body 4. The scanning unit 3 is a unit which scans the laser light on a sample S. Therefore, in this scanning unit 3, a beam splitter 5 is disposed on the optical path of the laser light, and an X-Y scanner 6 is disposed on a reflection optical path of the beam splitter 5.

The X-Y scanner 6 scans the laser light in an X direction set in the laser microscope, and a Y direction crossing at right angles to the X direction.

The sample S is a cell in which, for example, a GFP and a yellow fluorescent protein (YFP) are subjected to gene development.

Moreover, a dichroic mirror 8 and mirror 9 are disposed in series via a mirror 7 on a transmission optical path (optical path of a direction in which the light is incident upon the beam splitter 5 from the X-Y scanner 6) of the beam splitter 5.

The dichroic mirror 8 splits a fluorescent light of two wavelengths $\lambda 1'$, $\lambda 2'$ emitted when the sample S is irradiated with the laser light of two wavelengths of 488 nm and 514.5 nm. That is, the dichroic mirror 8 has a function for reflecting the fluorescent light of one wavelength $\lambda 1'$ and transmitting the fluorescent light of the other wavelength $\lambda 2'$.

A confocal lens 10a, confocal pinhole 11a, band pass filter 12a and optical detector 13a are disposed on the reflection optical path of the dichroic mirror 8.

A confocal lens 10b, confocal pinhole 11b, band pass filter 12b and optical detector 13b are disposed on the reflection optical path of the mirror 9 which is on the transmission optical path of the dichroic mirror 8.

A mirror 15 and prism for observation 16 are disposed on a laser optical path scanned by the X-Y scanner 6 via a pupil projection lens 14. Either one of the mirror 15 and prism for observation 16 is disposed on the optical path by a switching apparatus 17. An objective lens 19 is disposed on the reflection optical path of the mirror 15 via a tube lens 18. Additionally, when the prism for observation 16 is disposed in the optical path, the sample S can visually be observed through an eyepiece lens 20.

A beam splitter 21 is disposed in the scanning unit 3. The beam splitter 21 is disposed on the optical path of the laser light extending to the beam splitter 5 from an AOTF 25. The beam splitter 21 extracts a part of the laser light of two wavelengths of $\lambda 1=488$ nm and $\lambda 2=514.5$ nm. A prism 22 is disposed on the optical path of the extracted laser light.

This prism 22 spectrally resolves the laser light of two wavelengths $\lambda 1=488$ nm and $\lambda 2=514.5$ nm. That is, the prism 22 splits the laser light into two laser lights of wavelengths $\lambda 1=488$ nm and $\lambda 2=514.5$ nm.

A two-split photodiode 23 is disposed in a spectrum emission direction of the prism 22. The two-split photodiode 23 has a function of a light receiving element array for receiving the laser lights spectrally resolved by the prism 22. A split surface of the two-split photodiode 23 is disposed in the same direction as a direction in which spectrum is resolved.

A controller 24 inputs a detection signal outputted from the two-split photodiode 23, and outputs a control signal for controlling (wavelength selection control, amplitude control) the AOTF 25 fixed to an output end of the argon laser 2 based on the detection signal so that respective light intensities of both lines of wavelengths $\lambda 1=488$ nm and $\lambda 2=514.5$ nm become constant.

The AOTF 25 is fixed to the output end of the argon laser 2. The AOTF 25 receives the control signal outputted from the controller 24, selects the wavelength from two emission wavelengths $\lambda 1=488$ nm and $\lambda 2=514.5$ nm, and continuously controls an emission output.

An operation of the scanning type laser microscope constituted as described above will next be described.

The laser light of two wavelengths λ1=488 nm and λ2=514.5 nm is emitted/outputted from the argon laser 2. The laser light is transmitted through the AOTF 25, and incident upon the beam splitter 21. A part of the laser light is extracted, and incident upon the prism 22.

The prism 22 spectrally resolves the laser light into the laser lights of two wavelengths λ1=488 nm and λ2=514.5 nm. Each one of the spectrally resolved laser lights of two wavelengths is incident upon each split surface of the two-split photodiode 23 as the laser light of each line.

The two-split photodiode 23 receives each one of the laser lights spectrally resolved by the prism 22 via each split surface and outputs each detection signal.

In this case, when there are output fluctuations in the lines of laser lights of two wavelengths λ1=488 nm and λ2=514.5 nm emitted/outputted from the argon laser 2, the fluctuations of the light intensities of these lines are detected by the two-split photodiode 23.

The controller 24 inputs each detection signal outputted from the two-split photodiode 23, and outputs the control signal to the AOTF 25 based on the detection signal so that the respective light intensities of both lines of the wavelengths λ1=488 nm and λ2=514.5 nm become constant.

The AOTF 25 receives the control signal outputted from the controller 24, selects the wavelength from two emission wavelengths λ1=488 nm and λ2=514.5 nm, and continuously controls the emission output.

As a result, the respective light intensities of both lines of the wavelengths λ1=488 nm and λ2=514.5 nm become constant.

Additionally, in the observation of the sample S of the cell in which the GFP and YFP are subjected to gene development, the light intensities of both lines of wavelengths λ1=488 nm and λ2=514.5 nm are controlled to be constant at different wavelength values, respectively.

The laser light, controlled so that the respective light intensities of both lines of wavelengths λ1=488 nm and λ2=514.5 nm become constant, is reflected by the beam splitter 5 and scanned in an X-Y direction by the X-Y scanner 6.

The scanned laser light is transmitted through the pupil projection lens 14, reflected by the mirror 15, transmitted through the tube lens 18, forms a spot by the objective lens 19, and is scanned on the sample S.

Respective fluorescent lights of wavelengths λ1' and λ2' emitted from the sample S return in a direction opposite to a direction of the optical path of the laser light with which the sample S is irradiated. That is, each fluorescent light is passed through the tube lens 18, mirror 15, pupil projection lens 14, and X-Y scanner 6 from the objective lens 19, further transmitted through the beam splitter 5, reflected by the mirror 7, and incident upon the dichroic mirror 8.

In the fluorescent light of two wavelengths λ1', λ2', the dichroic mirror 8 reflects one fluorescent light of wavelength λ1' and transmits the other fluorescent light of wavelength λ2'. The fluorescent light of the wavelength λ1' reflected by the dichroic mirror 8 is passed through the confocal lens 10a, confocal pinhole 11a, and band pass filter 12a and incident upon the optical detector 13a.

Additionally, the fluorescent light of the wavelength λ2' transmitted through the dichroic mirror 8 is passed through the confocal lens 10b, confocal pinhole 11b, and band pass filter 12b and incident upon the optical detector 13b.

These optical detectors 13a, 13b output respective fluorescent intensity signals. Therefore, when these fluorescent intensity signals are accumulated in synchronization with a drive signal of the X-Y scanner 6, images of respective fluorescent lights of two wavelengths λ1', λ2' are formed.

As described above, in the first embodiment, the beam splitter 21 extracts a part of the laser light of two wavelengths λ1=488 nm and λ2=514.5 nm, the prism 22 spectrally resolves the laser light of two wavelengths λ1=488 nm and λ2=514.5 nm, and the two-split photodiode 23 detects the intensities of two lines spectrally resolved in this manner. Moreover, the controller 24 controls the AOTF 25 fixed to the output end of the argon laser 2 based on the detection signal outputted from the two-split photodiode 23 so that the respective light intensities of both lines of wavelengths λ1=488 nm and λ2=514.5 nm become constant.

Thereby, the light intensities of both lines of wavelengths λ1=488 nm and λ2=514.5 nm can simultaneously and steadily be controlled to be constant. Therefore, for example, the cell in which the GFP and YFP are subjected to the gene development can be observed as the sample S over a long time with a high reliability. Furthermore, since the two-split photodiode 23 is used, the laser microscope can inexpensively be constituted.

A second embodiment of the present invention will next be described with reference to the drawings. Additionally, the same part as that of FIG. 1 is denoted with the same reference numeral, and detailed description thereof is omitted.

Figure 2:
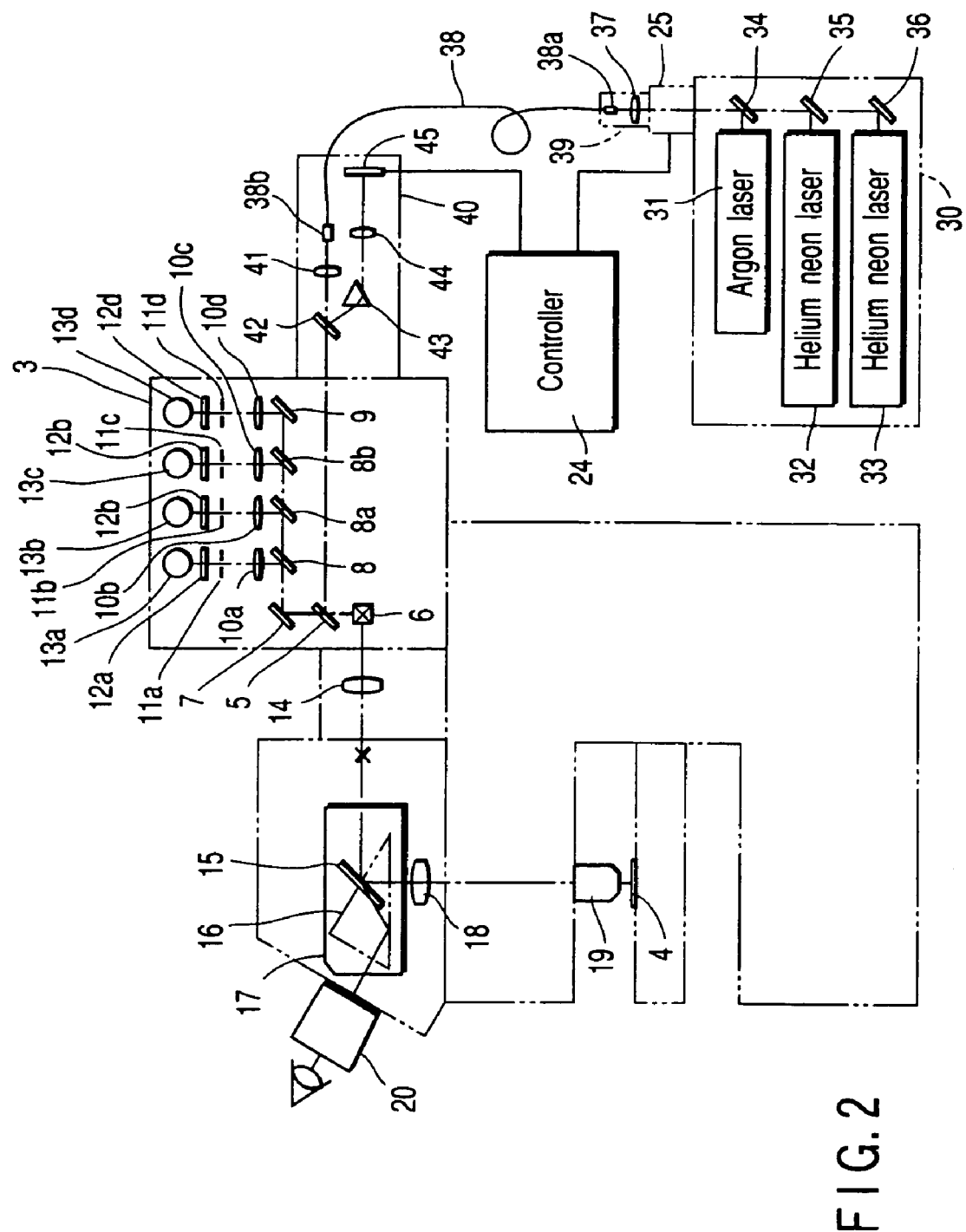
FIG. 2 is a constitution diagram showing a second embodiment of the scanning type laser microscope according to the present invention.

FIG. 2 is a constitution diagram of the laser scanning microscope. An argon laser 31, helium neon laser 32, and helium neon laser 33 are disposed in a base 30.

The argon laser 31 mainly emits/outputs a laser light of three wavelengths λ1=488 nm, λ2=514.5 nm, λ3=457.9 nm.

The helium neon laser 32 emits/outputs the laser light of a wavelength λ4=543 nm.

The helium neon laser 33 emits/outputs the laser light of a wavelength λ5=633 nm.

For these lasers, a dichroic mirror 34 is disposed on an emission optical path of the argon laser 31, a dichroic mirror 35 is disposed on the emission optical path of the helium neon laser 32, and a mirror 36 is disposed on the emission optical path of the helium neon laser 33.

Therefore, the respective laser lights emitted/outputted from these lasers 31, 32, 33 are combined into one laser light by the dichroic mirrors 34, 35 and mirror 36.

Moreover, the AOTF 25 is fixed to the emission end of one laser light in the base 30. The AOTF 25 selects an arbitrary combination of wavelengths with respect to five emission wavelengths λ1=488 nm, λ2=514.5 nm, λ3=457.9 nm, λ4=543 nm, λ5=633 nm, and continuously controls the emission output by the control of the controller 24.

A fiber coupler 39 is fixed to the emission end of the AOTF 25. One end of an optical fiber 38 is fixed to the fiber coupler 39, and a converging lens 37 is disposed inside the coupler. One optical fiber end 38a of the optical fiber 38 is positioned in a converging position of the converging lens 37 in the fiber coupler 39.

Figure 3:
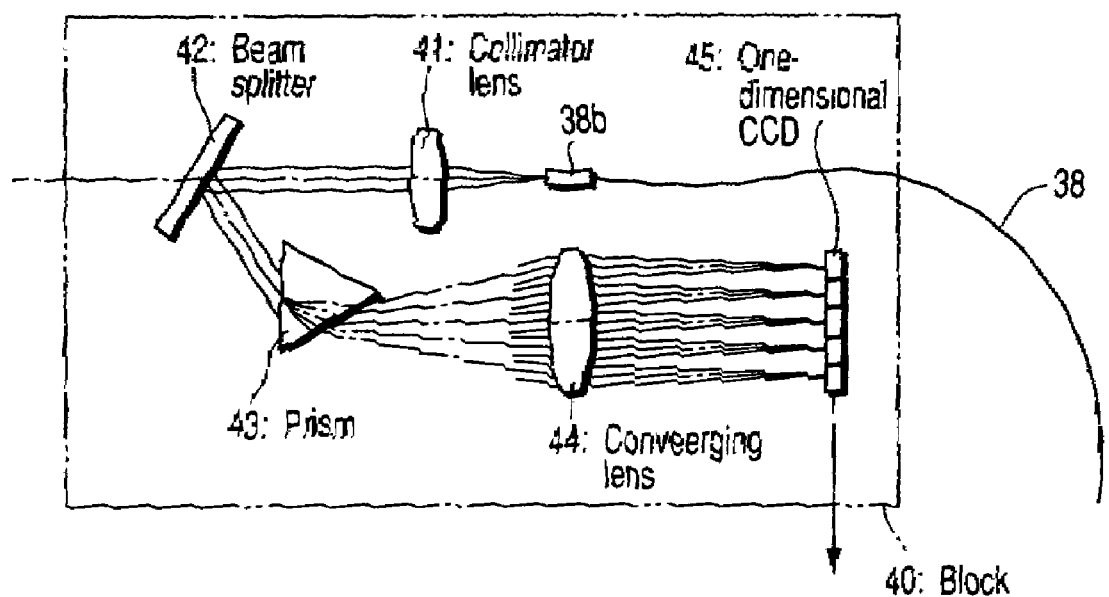
FIG. 3 is a constitution diagram in a block in the second embodiment of the scanning type laser microscope according to the present invention.

On the other hand, one block 40 for resolving and monitoring the spectrum is detachably attached to the scanning unit 3 constituting the laser microscope main body 4. FIG. 3 is an enlarged constitution diagram of the block 40.

Other optical fiber end 38b of the optical fiber 38 is inserted/fixed into the block 40. A beam splitter 42 is disposed via a collimator lens 41 on the optical path of the laser light emitted from the optical fiber end 38b. The beam splitter 42 extracts a part of the laser light collimated by the collimator lens 41.

A prism 43 is disposed on the optical path of the laser light extracted by the beam splitter 42.

The prism 43 spectrally resolves the laser light emitted from the optical fiber end 38b into the laser lights of five wavelengths $\lambda 1=488$ nm, $\lambda 2=514.5$ nm, $\lambda 3=457.9$ nm, $\lambda 4=543$ nm, $\lambda 5=633$ nm.

A one-dimensional CCD 45 is disposed via a converging lens 44 in a spectrum emission direction of the prism 43. The one-dimensional CCD 45 receives the laser lights spectrally resolved by the prism 43, and outputs each detection signal for each wavelength.

Concretely, the one-dimensional CCD 45 has five divided block surfaces corresponding to the respective lines of the wavelengths $\lambda 1=488$ nm, $\lambda 2=514.5$ nm, $\lambda 3=457.9$ nm, $\lambda 4=543$ nm, $\lambda 5=633$ nm, and outputs each detection signal via each block surface.

Additionally, the detection signals indicate a sum of output signals of the respective elements for the respective block surfaces.

The controller 24 inputs the respective detection signals outputted from the one-dimensional CCD 45, and outputs the control signal to the AOTF 25 based on the detection signals so that the respective light intensities of the respective lines of the wavelengths $\lambda 1=488$ nm, $\lambda 2=514.5$ nm, $\lambda 3=457.9$ nm, $\lambda 4=543$ nm, $\lambda 5=633$ nm become constant.

Additionally, dichroic mirrors 8a, 8b, 8c, confocal lenses 10a, 10b, 10c, 10d, confocal pinholes 11a, 11b, 11c, 11d, band pass filters 12a, 12b, 12c, 12d, optical detectors 13a, 13b, 13c, 13d, and mirror 9 are disposed in the scanning unit 3, so that the sample S marked with four types of fluorescent lights at maximum can simultaneously be observed.

The operation of the laser scanning microscope constituted as described above will next be described.

The argon laser 31 emits/outputs the laser light of three wavelengths $\lambda 1=488$ nm, $\lambda 2=514.5$ nm, $\lambda 3=457.9$ nm. The helium neon laser 32 emits/outputs the laser light of wavelength $\lambda 4=543$ nm. The helium neon laser 33 emits/outputs the laser light of wavelength $\lambda 5=633$ nm.

These laser lights are combined into one laser light by the dichroic mirrors 34, 35 and mirror 36.

The AOTF 25 selects the arbitrary combination of wavelengths from the combined laser light.

The laser light having the wavelength selected by the AOTF 25 is converged by the converging lens 37 and incident upon the one optical fiber end 38a of the optical fiber 38.

The laser light is propagated through the optical fiber 38 and emitted from the other optical fiber end 38b inserted into the block 40.

The laser light emitted from the optical fiber end 38b is collimated by the collimator lens 41, and a part of the laser light is extracted by the beam splitter 42 and incident upon the prism 43.

The prism 43 spectrally resolves the laser light emitted from the optical fiber end 38b into the laser lights of five wavelengths $\lambda 1=488$ nm, $\lambda 2=514.5$ nm, $\lambda 3=457.9$ nm, $\lambda 4=543$ nm, $\lambda 5=633$ nm.

The laser lights of respective lines of wavelengths $\lambda 1=488$ nm, $\lambda 2=514.5$ nm, $\lambda 3=457.9$ nm, $\lambda 4=543$ nm, $\lambda 5=633$ nm spectrally resolved in this manner are incident upon five block surfaces of the one-dimensional CCD 45.

The one-dimensional CCD 45 receives the laser lights spectrally resolved by the prism 43, and outputs each detection signal via each block surface.

In this case, when there is the output fluctuation in the laser light of the wavelength oscillated in the arbitrary combination of the respective lines of wavelengths $\lambda 1=488$ nm, $\lambda 2=514.5$ nm, $\lambda 3=457.9$ nm, $\lambda 4=543$ nm, $\lambda 5=633$ nm, the one-dimensional CCD 45 detects the fluctuations of the light intensities of these lines and outputs the detection signals.

The controller 24 inputs the respective detection signals outputted from the one-dimensional CCD 45, and outputs the control signal to the AOTF 25 based on the detection signals so that the respective light intensities of respective lines of wavelengths $\lambda 1=488$ nm, $\lambda 2=514.5$ nm, $\lambda 3=457.9$ nm, $\lambda 4=543$ nm, $\lambda 5=633$ nm become constant.

The AOTF 25 receives the control signal outputted from the controller 24, selects the wavelength with respect to five emission wavelengths $\lambda 1=488$ nm, $\lambda 2=514.5$ nm, $\lambda 3=457.9$ nm, $\lambda 4=543$ nm, $\lambda 5=633$ nm, and continuously controls the emission output.

As a result, the respective light intensities of lines of wavelengths $\lambda 1=488$ nm, $\lambda 2=514.5$ nm, $\lambda 3=457.9$ nm, $\lambda 4=543$ nm, $\lambda 5=633$ nm become constant.

The laser light, controlled so that the respective light intensities of lines of wavelengths become constant, is reflected by the beam splitter 5 and scanned in the X-Y direction by the X-Y scanner 6.

The scanned laser light is transmitted through the pupil projection lens 14, reflected by the mirror 15, transmitted through the image forming lens 18, forms the spot by the objective lens 19, and is scanned on the sample S.

Each fluorescent light emitted from the sample S returns in the direction opposite to the direction of the optical path of the laser light with which the sample S is irradiated. That is, each fluorescent light is passed through the tube lens 18, mirror 15, pupil projection lens 14, and X-Y scanner 6 from the objective lens 19, further transmitted through the beam splitter 5, reflected by the mirror 7, and incident upon the dichroic mirror 8a.

Then, by each of the dichroic mirrors 8a to 8c, the fluorescent lights of respective wavelengths are divided and are incident upon each of the optical detectors 13a, 13b, 13c, 13d. Then, these optical detectors 13a, 13b, 13c, 13d output respective fluorescent intensity signals. Thus, when these fluorescent intensity signals are accumulated in synchronization with the drive signal of the X-Y scanner 6, the respective fluorescent images of the sample S marked with four types of fluorescent lights at maximum are formed.

As described above, in the second embodiment, the beam splitter 42 extracts a part of the laser light of the arbitrary combination of wavelengths selected from the laser light of five wavelengths $\lambda 1=488$ nm, $\lambda 2=514.5$ nm, $\lambda 3=457.9$ nm, $\lambda 4=543$ nm, $\lambda 5=633$ nm, the prism 43 spectrally resolves the laser light of these wavelengths, and the one-dimensional CCD 45 detects the respective intensities of the lines spectrally resolved in this manner. Moreover, the controller 24 controls the AOTF 25 based on the respective detection signals outputted from the one-dimensional CCD 45 so that the respective light intensities of the lines become constant.

Therefore, the light intensities of five lines of wavelengths $\lambda 1=488$ nm, $\lambda 2=514.5$ nm, $\lambda 3=457.9$ nm, $\lambda 4=543$ nm, $\lambda 5=633$ nm can simultaneously and steadily be controlled to be constant.

As a result, the gene developed cell of the sample S can be observed for a long time with a high reliability.

Moreover, the one-dimensional CCD 45 is used, so that the respective intensities of laser lines of a plurality of wavelengths can be controlled to be constant, and a design with a high degree of freedom is possible.

Furthermore, the collimator lens 41, beam splitter 42, prism 43, converging lens 44 and one-dimensional CCD 45 are constituted as one block 40. For example, there is another laser scanning microscope in which the scanning unit 3 is connected to the inverted type microscope main body. In this case, when erected and inverted types are to be selectively used in accordance with a purpose of use, a block including a laser light source and CCD for detecting the light intensity of each line can be used in common, and can inexpensively be constituted.

Additionally, the present invention is not limited to the first and second embodiments, and can variously be modified within the scope of the present invention in an implementation stage.

For example, the spectral resolution section in the first and second embodiments is not limited to the prisms 22, 43, and a diffraction grating or a beam splitter may also be used.

In order to control the respective laser light intensities of the plurality of wavelengths to be constant, a current value which emits each laser may independently be controlled, thereby constantly controlling the respective laser light intensities of the plurality of wavelengths.

Another control method may comprise disposing respective AOTFs in the argon lasers 2, 31, and helium neon lasers 32, 33, and controlling the respective laser light intensities of the plurality of wavelengths to be constant by these AOTFs disposed every laser.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser microscope which irradiates a sample dyed with a plurality of fluorescent indicators with a laser light, said laser microscope comprising:
    a light source to emit the laser light toward the sample;
    a spectral resolution section to spectrally resolve the laser light emitted toward the sample into laser lines of different emission wavelengths which are suitable for excitation of the respective fluorescent indicators and which have respective different optical axes;
    a light receiving element array to receive the laser lines simultaneously and to output a detection signal that includes light intensity information of the laser lines; and
    a controller to simultaneously control light intensities of the respective laser lines based on the detection signal;
    wherein the laser microscope detects a plurality of fluorescent lights emitted from the sample when the laser lines are irradiated thereto.

2. The laser microscope according to claim 1, further comprising an acousto-optical element fixed to an output end of the laser source to alter the light intensities of the laser lines, wherein the acousto-optical element receives a control signal outputted from the controller.

3. The laser microscope according to claim 2, wherein the controller controls the acousto-optical element to control the respective light intensities of the laser lines to be constant.

4. The laser microscope according to claim 1, wherein the light source comprises one laser light source that emits the laser light including the laser lines of the different emission wavelengths.

5. The laser microscope according to claim 1, wherein the light source comprises a plurality of laser light sources that emit laser lights of different emission wavelengths.

6. The laser microscope according to claim 1, wherein the spectral resolution section comprises one of a prism, a diffraction grating or a beam splitter.

7. The laser microscope according to claim 1, wherein the light receiving element array comprises one of a split photodiode and a solid-state image sensing device.

8. The laser microscope according to claim 1, further comprising a converging lens that is disposed between the spectral resolution section and the light receiving element array;
    wherein the spectral resolution section comprises a prism, the light receiving element array comprises a one-dimensional CCD which receives the laser lights of the different emission wavelengths, and the converging lens converge the lights of the different emission wavelengths resolved by the prism on the one-dimensional CCD.

9. The laser microscope according to claim 1, further comprising:
    an optical fiber to transmit the laser light from the laser source;
    a collimator lens to collimate the laser light emitted from the optical fiber;
    a beam splitter to split the laser light collimated by the collimator lens and to guide a part of the split laser light to the spectral resolution section; and
    a converging lens to converge the lights of the different emission wavelengths on the light receiving element array.

10. The laser microscope according to claim 9, wherein the collimator lens, the beam splitter, the spectral resolution section, the converging lens, and the light receiving element array are formed in a single block, and the block is attached to and detachable from a main body of the laser microscope.

* * * * *